March 30, 1943. J. BUTLER 2,315,397
ROLLING ATTACHMENT FOR MOTOR VEHICLES
Filed Dec. 30, 1940
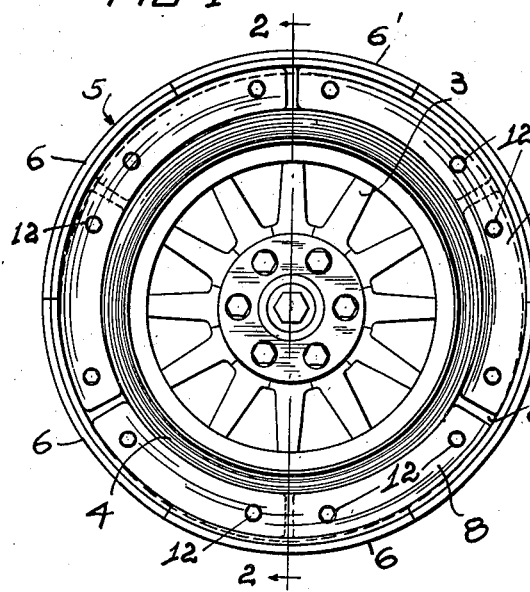
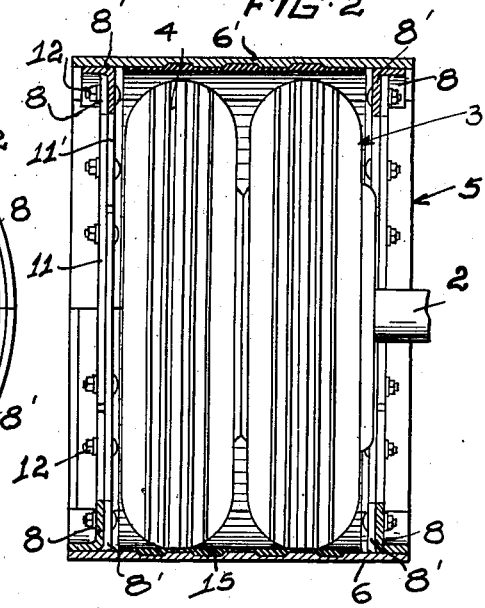
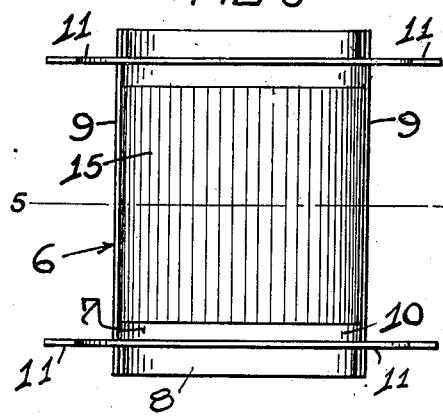
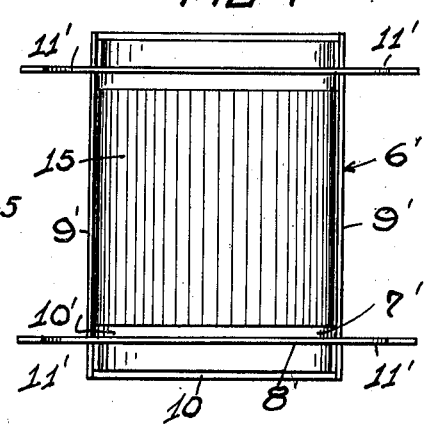
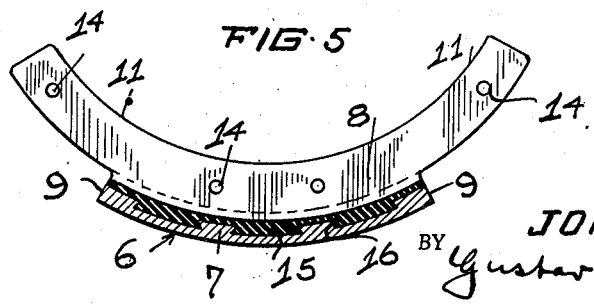
INVENTOR.
JOHN BUTLER Patented Mar. 30, 1943

2,315,397

UNITED STATES PATENT OFFICE 2,315,397

ROLLING ATTACHMENT FOR MOTOR VEHICLES

John Butler, Cleveland Heights, Ohio

Application December 30, 1940, Serial No. 372,275

2 Claims. (Cl. 94—50)

This invention relates in general to attachments for motor vehicles wheels and more particularly to road rolling attachments or rollers for the wheels of motor vehicles to be used for rolling roads during maintenance work not warranting the use of road rollers on account of expense involved in relation to volume of work to be done.

The general object of the present invention resides in the provision of a cylindrical, hollow road rolling device for use with motor vehicle wheels, which is dimensioned to readily and easily be sleeved upon a wheel of a motor vehicle, and when sleeved upon a wheel permits a rolling movement between the device and the wheel when same is rotated.

Another object of the invention is the provision of a cylindrical, hollow road rolling device for use with motor vehicle wheels, which is made up in sections to facilitate its mounting on a wheel without lifting same and is dimensioned to permit of free rolling movement between the device and the wheel when the device is sleeved on the wheel and the wheel is rotated.

A further object of the invention is the provision of a cylindrical, hollow road rolling device for use with motor vehicle wheels, which is dimensioned to readily and easily be sleeved upon a wheel of a motor vehicle which, when sleeved upon a wheel, permits rolling movement between the device and the wheel when same is rotated and which on its inner peripheral surface is provided with means to effect increased frictional contact with the wheel, so as to prevent slippage between the wheel and the device during rolling movement.

In addition, the invention has certain other marked superiorities which radically distinguish it from presently known structures. The improvements or superior characteristics, embodying certain novel features of construction, are clearly set forth in the following specification and the appended claims; and a preferred form of embodiment of the invention is hereinafter shown with reference to the accompanying drawing forming part of the specification.

In the drawing:

Fig. 1 is a side elevation illustrating a sectional roller device made in accordance with the invention, the device encircling a driving wheel of a motor vehicle with dual driving wheels.

Fig. 2 is a vertical sectional view on line 2—2 of Fig. 1.

Fig. 3 is an enlarged plan view of one of the sectional elements of the device having widely spaced connecting members.

Fig. 4 is an enlarged plan view of another one of the sectional elements having narrower spaced connecting members; and Fig. 5 is a sectional view through the sectional element shown in Fig. 3, the section being taken on line 5—5 of said figure.

Referring more particularly to the drawing, reference numeral 2 denotes the rear axle of a truck for road maintenance work which, as customary, is provided with dual driving wheels 3 and pneumatic tires 4 mounted thereon, all as generally practiced.

Wheels 3 have loosely sleeved thereupon a cylindrical, sectional, hollow road roller device 5 assembled from a plurality of sector-like elements 6, 6' which are securely fastened to each other, as will be described later. These elements are made of suitable gauge, strength and metal for the purpose intended and, when assembled, form a road rolling device, the internal diameter of which is larger than the diameter of tires 4. Elements 6, 6' each embody a sector-like base 7, 7' respectively, and angular stiffening, connecting and guiding members 8, 8' exttended beyond edges 9, 9' of said bases and shaped to contact the inner surfaces 10, 10' thereof near its sides. In addition, the space between members 8 on elements 6 is slightly larger than the space between members 8' on elements 6' to effect extension of perforated end portions 11' of members 8' between end portions 11 of members 8 and permit of properly securing these ends to each other by bolts 12 extended through perforations 14 in members 8 and 8'. When assembled, elements 6, 6' are united to the cylindrical roller device 5 in which the inner surfaces 10, 10' of elements 6, 6' contact with tires 4 only at their lower portions and therefore permit free rolling of roller device 5 when wheel 3 of the truck is rotated. Proper frictional contact of inner surfaces 10, 10' of elements 6, 6' with tires 4 is effected by lining sector-like bases 7, 7' at their inner surfaces with rubber or similar friction material 15 which is, preferably, interlocked with said bases as at 16.

The construction of roller devices 5 in sections and their size with respect to the wheels of a truck permit of assembly of these devices on such wheels without difficulty by moving the truck to roll its rear wheels upon sector elements 6, 6' and thereafter attaching sector elements 6 and later elements 6' until the device 5 is fully assembled to a cylindrical roller. Such assembly, of course, can be effected without raising the wheels of the truck and therefore permits quick and efficient assembly by the operator of a truck, particularly, as such sections 6 and 6' can readily and easily be handled by an operator.

Having thus described my invention, what I claim is:

1. The combination of a pneumatic tire wheel with a cylindrical, hollow sectional road rolling device freely rotatably assembled on said pneumatic tire wheel, the inner diameter of the road rolling device being larger than the outer diameter of said tire wheel when fully inflated, the sections of said sectional road rolling device abut each other and each include a base member and stiffening and guiding members secured to the inside of said base member and extended beyond the edges thereof, the stiffening and guiding members of adjoining sections being offset with respect to each other and their extended portions attached to each other in overlapping relationship.

2. The combination of a pneumatic tire wheel with a cylindrical, hollow road rolling device having friction means on its inner surface and an internal diameter larger than the external diameter of said pneumatic tire wheel when fully inflated, said road rolling device being assembled from sections abutting each other and secured to each other, each of said sections having flanged means secured to its inside face and extended beyond its end portions, the extended portions of the flanged means of adjoining sections being secured to each other in overlapping relationship.

JOHN BUTLER.